United States Patent
Marques et al.

(10) Patent No.: US 8,988,984 B2
(45) Date of Patent: Mar. 24, 2015

(54) DESIGNATED FORWARDER ELECTION FOR VPLS WITH BGP-BASED MAC LEARNING

(75) Inventors: Pedro Miguel Martins Roque Marques, Mountain View, CA (US); Ali Sajassi, San Ramon, CA (US); Samer Salam, Vancouver (CA); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 13/021,530

(22) Filed: Feb. 4, 2011

(65) Prior Publication Data

US 2012/0201124 A1    Aug. 9, 2012

(51) Int. Cl.
*H04L 12/26* (2006.01)
*H04L 12/715* (2013.01)
*H04L 12/703* (2013.01)

(52) U.S. Cl.
CPC .............. *H04L 45/04* (2013.01); *H04L 45/28* (2013.01)
USPC ............ 370/219; 370/225; 370/390; 370/432

(58) Field of Classification Search
None
See application file for complete search history.

(56) References Cited

U.S. PATENT DOCUMENTS

| 5,917,820 A | * | 6/1999 | Rekhter | 370/392 |
| 6,789,121 B2 | * | 9/2004 | Lamberton et al. | 709/227 |
| 7,139,790 B1 | * | 11/2006 | Wang et al. | 709/201 |
| 8,259,563 B1 | * | 9/2012 | Kothari et al. | 370/225 |

OTHER PUBLICATIONS

"Configuring Multihoming on a VPLS Border Router", Junos 9.6 Feature Guide, Juniper Networks, Inc., 2010, 2 pgs.
Aggarwal, et al. "BGP MPLS Based MAC VPN", draft-raggarwa-mac-vpn-01.txt, Internet Draft, Network Working Group, Juniper Networks, Jun. 2, 2010, 26 pgs.
Sajassi, et al., "Routed VPLS using BGP", draft-sajassi-l2vpn-rvpls-bgp-00.txt, Internet Draft, Internet Working Group, Mar. 23, 2010, 18 pgs.
Sajassi, et al., "Routed VPLS using BGP", draft-sajassi-l2vpn-rvpls-bgp-01.txt, Internet Draft, Internet Working Group, Jul. 7, 2010, 31 pgs.

* cited by examiner

*Primary Examiner* — Alex Skripnikov
(74) *Attorney, Agent, or Firm* — Novak Druce Connolly Bove + Quigg LLP (57) ABSTRACT

In one embodiment, a network device may participate in an election process to elect one of two or more Provider Edge devices of a Redundancy Group to be a Designated Forwarder for the Redundancy Group, where the Redundancy Group is in a Service Provider network, and where the Redundancy Group serves a Customer Edge device of a customer network. The network device may forward multi-destination traffic to the Customer Edge device according to whether the network device is elected to be the Designated Forwarder for the Redundancy Group. Multi-destination traffic may include multicast traffic, broadcast traffic, or destination unknown unicast traffic.

21 Claims, 6 Drawing Sheets

BGP Message 500

| NLRI 502 | Extended Community Attribute 504 | Designated Forwarder Election Attribute 506 |

FIG. 5A

Designated Forwarder Election Attribute 506

| Type 508 | PEs in Redundancy Group 510 | Total number of in-service links connected to CE device (site) 512 | Number of in-service links that advertising PE has connected to the site 514 | DF election state 516 | Sequence Number 518 | VLAN group allocation to PEs 520 | Backup DF Information 522 |

FIG. 5B

DESIGNATED FORWARDER ELECTION FOR VPLS WITH BGP-BASED MAC LEARNING

BACKGROUND

1. Technical Field

The present disclosure relates generally to the election of a Designated Forwarder in a communication network and more particularly, to the election of a Designated Forwarder on a per-Redundancy Group basis.

2. Description of the Related Art

A Service Provider network typically provides service to customer networks via Provider Edge (PE) devices (e.g., routers) at the edge of the Service Provider network. More particularly, each PE device may be connected to a Customer Edge (CE) device (e.g., router) at the edge of a customer network.

Unfortunately, each PE device is subject to failure. Similarly, a link between a PE device and a corresponding CE device could fail. As a result, it is desirable to build redundancy into the Service Provider network.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a network device may participate in an election process to elect one of two or more Provider Edge devices of a Redundancy Group to be a Designated Forwarder for the Redundancy Group, where the Redundancy Group is in a Service Provider network, and where the Redundancy Group serves a Customer Edge device of a customer network. The network device may forward multi-destination traffic to the Customer Edge device according to whether the network device is elected to be the Designated Forwarder for the Redundancy Group. Multi-destination traffic may include multicast traffic, broadcast traffic, or destination unknown unicast traffic.

Specific Example Embodiments

Multi-homing is one possible solution for providing node, link and port redundancy for Service Providers offering Layer 2 Virtual Private Network (VPN) services. For example, Virtual Private LAN Switching (VPLS) multihoming enables a customer site (e.g., customer network) to be connected to multiple PE devices (e.g., routers). Each customer site may be associated with one of a plurality of customers. Each of the customers may have associated therewith one or more customer sites. Therefore, any two customer sites may be associated with the same customer or different customers. A customer may be an entity such as a business, company, organization, or individual.

Figure 1:
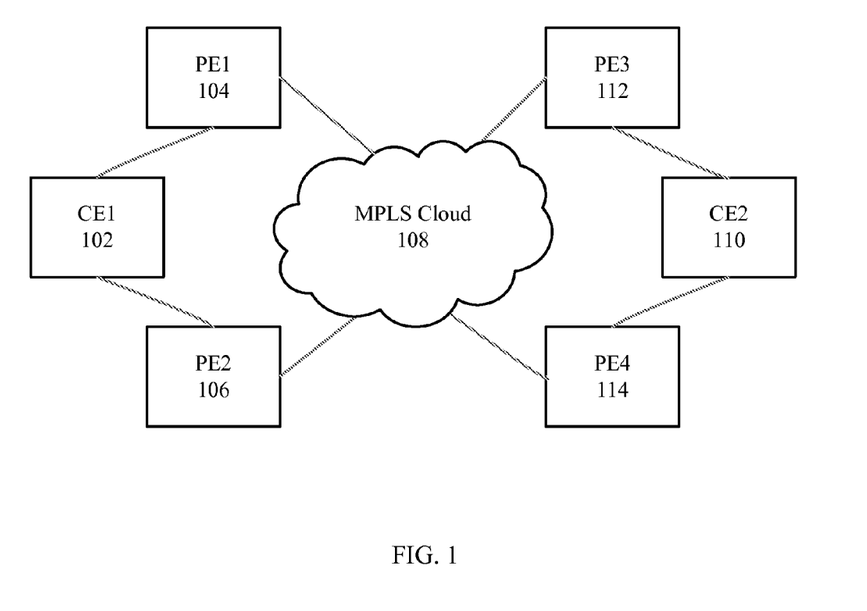
FIG. 1 is a diagram illustrating an example system supporting multi-homing in which various embodiments may be implemented.

For example, as shown in FIG. 1, a first customer site may be connected via a first CE device, CE1 102, to two PE devices, PE1 104 and PE2 106. The two PE devices, PE1 104 and PE2 106, may be connected to a core 108 of a Service Provider network such as a Multi-Protocol Label Switching (MPLS) core. Similarly, a second customer site may be connected via a second CE device, CE2 110, to two PE devices, PE3 112 and PE4 114. The two PE devices, PE3 112 and PE4 114, may be connected to the core 108, as shown.

In accordance with various embodiments, each PE device may be a member of one or more Redundancy Groups. Each Redundancy Group may include two or more PE devices. A Redundancy Group may offer multi-homed connectivity to a set of one or more CE devices, enabling the Redundancy Group to provide service to a customer site (e.g., network) coupled to the Service Provider network via the set of CE devices. In the example shown in FIG. 1, the two PE devices, PE1 104 and PE2 106, may form a first Redundancy Group that provides services to the first CE device, CE1 102. Similarly, the two PE devices, PE3 112 and PE4 114, may form a second Redundancy Group that provides services to the second CE device, CE2 110.

Figure 2:
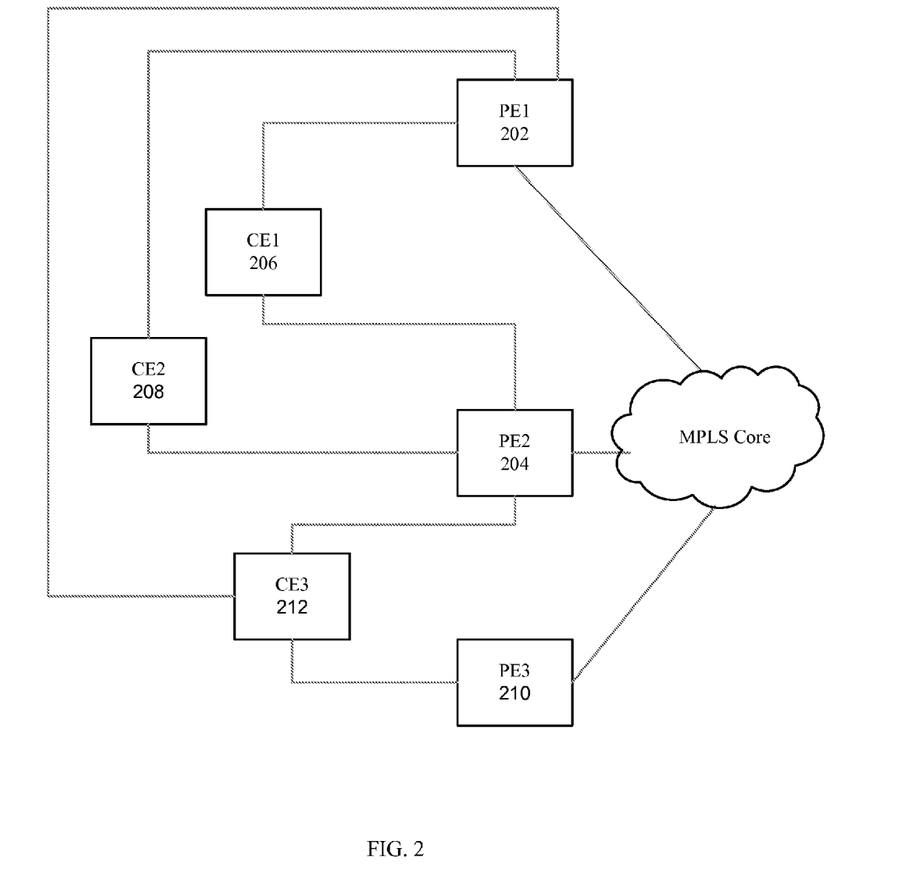
FIG. 2 is a diagram illustrating an example system supporting flexible multi-homing in which various embodiments may be implemented.

FIG. 2 is a diagram illustrating another example system in which various embodiments may be implemented. As shown in this example, a first Redundancy Group, RG1, may include a first PE device, PE1 202, and a second PE device, PE2 204. Thus, RG1 may offer multi-homed connectivity to a first CE device, CE1, 206 and a second CE device, CE2 208. In addition, a second Redundancy Group, RG2, may include the first PE device, PE1 202, the second PE device, PE2 204, and a third PE device, PE3 210. Therefore, RG2 may offer multi-homed connectivity to a third CE device, CE3 212. In this example, PE1 202 and PE2 204 offer flexible multi-homed grouping because they belong to more than a single Redundancy Group without any restrictions or limitations.

In accordance with various embodiments, the PE devices within a particular Redundancy Group provide active-active redundancy with load balancing of traffic among the PE devices within the Redundancy Group. In other words, each of the PE devices within the Redundancy Group may be simultaneously active, enabling the traffic to be distributed among the PE devices. As one example, the load balancing may be flow-based load balancing. A flow is generally understood to be associated with a particular source address and a particular destination address. As another example, the load may be distributed on a Virtual Local Area Network (VLAN) basis. As will be described in further detail below, in accordance with various embodiments, various mechanisms and/or algorithms may be used to distribute traffic among the PE devices of a redundancy group.

While many systems offer active-standby redundancy, active-active redundancy in a system implementing multi-homing may result in various problems. More particularly, for multi-destination traffic (e.g., broadcast, multicast, and destination unknown unicast), two problems may arise. First, traffic flooded from a given CE device may be transmitted via a loop back to the CE device. For example, as shown in FIG. 2, CE1 206 may send a multi-destination frame to PE1 202. When PE1 202 forwards the multi-destination frame over the network, the multi-destination frame may arrive at PE2 204, where PE2 204 sends the frame back to CE1 206. Second, duplicate frames may be forwarded to a CE device. For example, CE1 206 may send multi-destination traffic to PE1 202. PE1 202 may forward the multi-destination traffic over the network to arrive at PE2 204 and PE3 210. PE1 202 may locally switch the multi-destination traffic to CE3 212, and both PE2 204 and PE3 210 also forward frame to CE3 212. Hence, CE3 212 receives duplicate frames.

The disclosed embodiments enable a customer site (e.g., CE device) to be connected to two or more PE devices to provide redundant connectivity, while preventing both the formation of Layer 2 loops in the Service Provider's network and duplication of frames to and from the customer site. This may be accomplished, in part, by defining a Designated Forwarder (DF) PE device for handling all multi-destination traffic (e.g., frames) that has been received by the DF and transmitted to a particular multi-homed device (e.g., CE device). More particularly, the DF may be responsible for handling all multi-destination frames that have been received by the DF from the core (e.g., MPLS core) and have been transmitted towards a particular multi-homed device (e.g., CE device) associated with a particular customer site. Multi-destination traffic may include multicast traffic, broadcast traffic, and/or destination unknown unicast traffic.

In accordance with various embodiments, the DF is the sole PE device that is permitted to forward multi-destination traffic received from the core towards a particular multi-homed device. (All PE devices in the redundancy group can forward multi-destination traffic and non-multi-destination traffic from the CE device. In addition, all PE devices in the redundancy group can forward non-multi-destination traffic to the CE device.) As will be described in further detail below, the DF may be elected dynamically using a control protocol.

Figure 3:
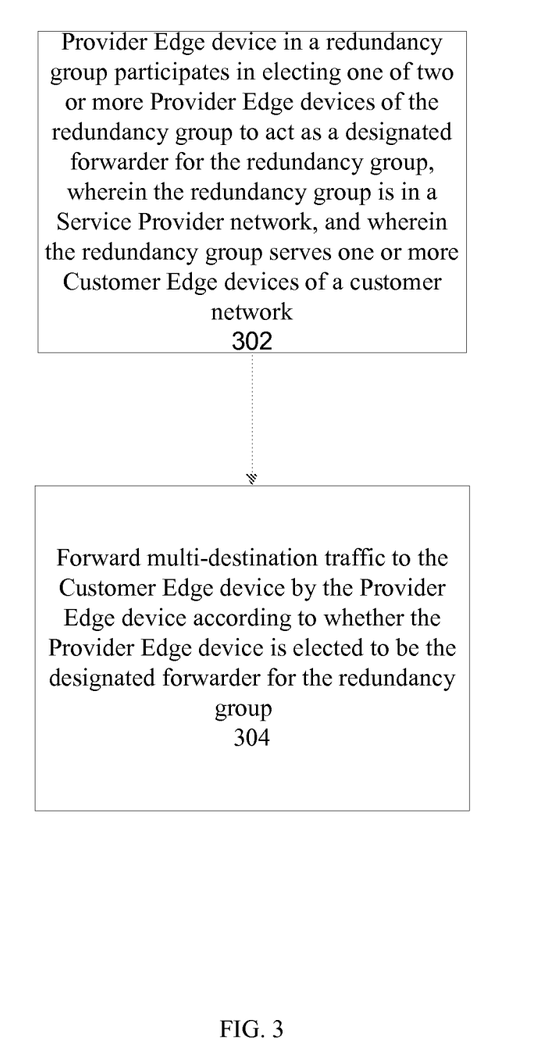
FIG. 3 is a process flow diagram illustrating an example method of forwarding multi-destination traffic via a Designated Forwarder for a Redundancy Group

FIG. 3 is a process flow diagram illustrating a simplified method of forwarding multi-destination traffic via a DF for a Redundancy Group. As shown in FIG. 3, a PE device in a Redundancy Group may participate in an election process at 302 to elect one of two or more PE devices of the Redundancy Group to be a DF for the Redundancy Group. The Redundancy Group may be in a Service Provider network. In addition, the Redundancy Group may serve a particular CE device of a customer network. An example election process will be described in further detail below with reference to FIG. 4.

The election process may be performed through the transmission of control messages among the PE devices of the Redundancy Group. More particularly, each of the PE devices may receive control message(s) from one or more other PE device(s) in the Redundancy Group, where each control message includes a DF election attribute. Upon receiving the control message(s), the PE device may obtain information from the DF election attribute of the control message(s). The DF may be elected based, at least in part, upon the information obtained from the DF election attribute of the control message(s). Example control messages will be described in further detail below with reference to FIGS. 5A-B.

The PE device may forward multi-destination traffic to the CE device at 304 according to whether the PE device is elected to be the DF for the Redundancy Group. More particularly, if the PE device is elected to be the DF for the Redundancy Group, the PE device may be solely responsible for forwarding multi-destination traffic to the CE device. In accordance with one embodiment, the PE device may enable forwarding of multi-destination traffic to the CE device by setting a state of its port that is connected to the CE device in a forwarding state.

If the PE device is not elected to be the DF for the Redundancy Group, the PE device may not forward multi-destination traffic to the CE device. More particularly, the PE device may block multi-destination traffic to the CE device. In accordance with one embodiment, the PE device may prevent the forwarding of multi-destination traffic to the CE device by setting a state of its port that is connected to the CE device in a blocking state.

In addition, the DF, once elected, may ensure that the load will be distributed among various PE devices in the redundancy group by assigning various roles to other PE devices within the Redundancy Group. More particularly, the DF may delegate one or more other PE devices to each act as a Proxy Designated Forwarder (P-DF) for forwarding at least a portion of the multi-destination traffic to the CE device. For example, the DF may instruct one or more of the other PE devices of the Redundancy Group that they are each (P-DF) PE devices for one or more Virtual Private Local Area Networks (VLANs) (for purposes of forwarding multi-destination traffic to the CE device on the associated VLANs). For example, the DF may instruct a first one of the other PE devices of the Redundancy Group that it is the P-DF responsible for a first set of one or more VLANs (e.g., VLANs 1-50), and instruct a second one of the other PE devices of the Redundancy Group that it is the P-DF responsible for a second set of one or more VLANs (e.g., VLANs 51-100). In this example, the first one of the other PE devices may be responsible for forwarding multi-destination traffic to the CE device for the first set of the one or more VLANs (e.g., for traffic received from a source device or destined to a destination device within a particular VLAN in the first set of VLANs). Similarly, the second one of the other PE devices may be responsible for forwarding multi-destination traffic to the CE device for the second set of the one or more VLANs (e.g., for traffic received from a source device or destined to a destination device within a particular VLAN in the second set of VLANs).

The DF may also instruct a third one of the other PE devices of the Redundancy Group to act as a backup DF for forwarding multi-destination traffic to the CE device. The backup DF may take over for a failed PE device in the Redundancy Group (e.g., including the DF). In accordance with one embodiment, the backup DF may take over a set of VLANs of a failed one of the PE devices in the Redundancy Group. For example, upon failure of the second PE device, the third PE device may take over forwarding responsibility for the second set of VLANs, VLANs 51-100. In accordance with another embodiment, the backup DF may take over for the DF upon failure of the DF (or a link between the DF and the CE device). Therefore, by assigning a backup DF, the election process need not be re-run upon failure of the DF.

Election Process

Figure 4:
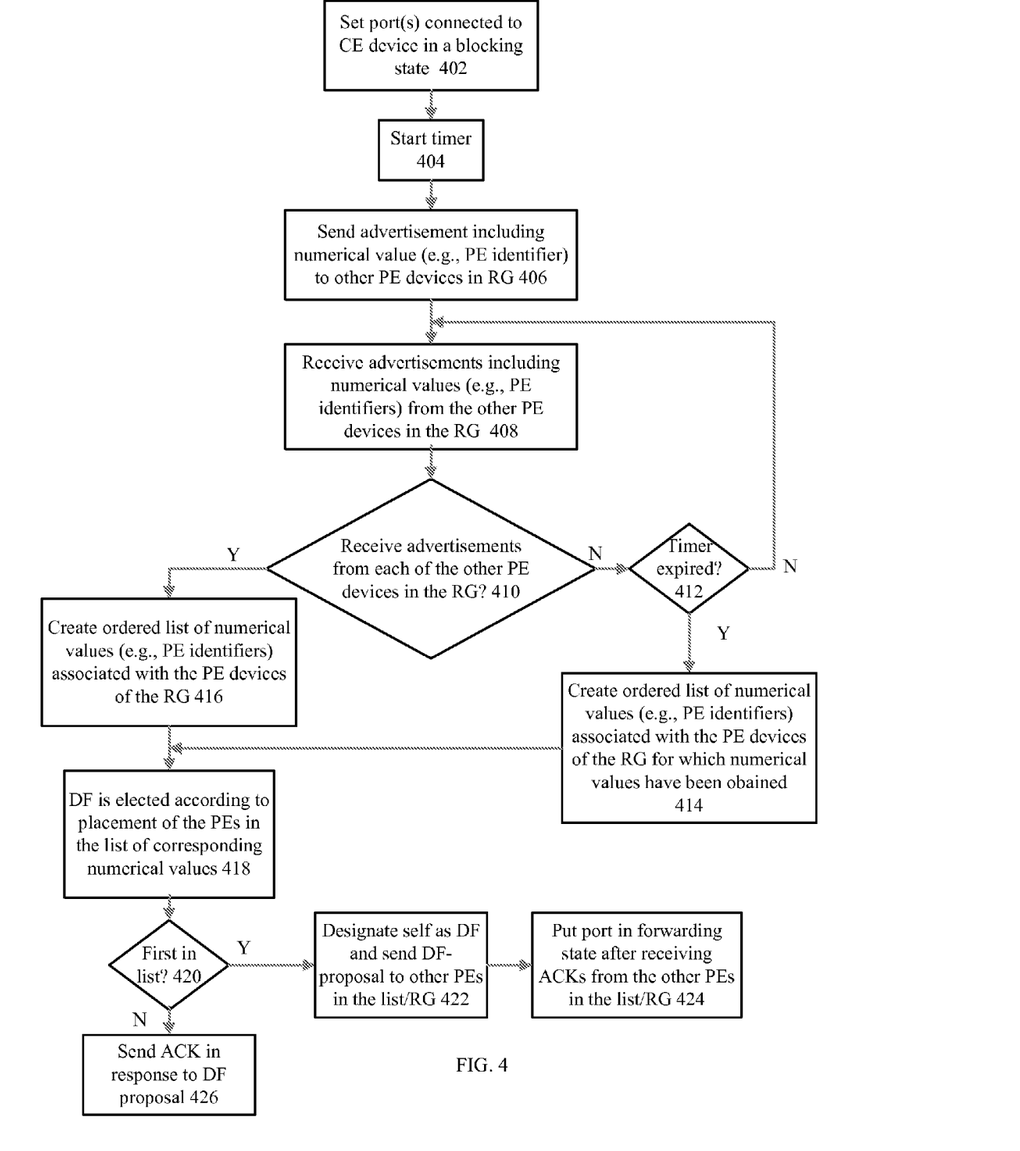
FIG. 4 is a process flow diagram illustrating an example method of implementing a Designated Forwarder election process as shown at 302 of FIG. 3.

Each PE device in a Redundancy Group may participate in the process of electing a DF for the Redundancy Group. FIG. 4 is a process flow diagram illustrating an example method of implementing a DF election process as shown at 302 of FIG. 3 by a PE device. The PE device may perform initialization by setting its port(s) connected to a CE device in a blocking state at 402. The PE device may also set a timer at 404.

The election of a DF may be performed by comparing numerical values associated with each of the PE devices in the Redundancy Group. Thus, the PE device may transmit a message including a numerical value to other PE devices of the Redundancy Group at 406. For example, the numerical value may be a PE device identifier (e.g., router identifier) or a randomly generated number. More particularly, the PE device may send an advertisement including the numerical value to the other PE devices. In addition, the PE device may receive numerical values (e.g., PE identifiers) from the other PE devices of the Redundancy Group at 408 (e.g., in the form of advertisements). However, the PE device may not receive numerical values (e.g., PE identifiers) from PE devices of other Redundancy Groups (where those PE devices are not also in the current Redundancy Group).

The PE device may determine whether it has received numerical values (e.g., advertisements) from each of the other PE devices in the Redundancy Group at 410. This may be accomplished by ascertaining a number of the other PE devices in the Redundancy Group based upon a total number of links from the CE device to the Service Provider network. In one embodiment, the PE device may ascertain a total number of links from the CE device (or customer site/network) to the Service Provider network. For example, the PE device may receive the total number of links from the CE device after the CE device transmits the total number of links to the PE devices within the Redundancy Group. More particularly, the CE device may report a total number of links M to all PE devices, where the PE devices may be in any Redundancy Group. Each PE device in the Redundancy Group may report the number of links it has to the CE device, which may be represented as N1, N2 . . . NP, where Ni is the number of links that PEi device has to the CE device (assuming that the number of PE devices in the Redundancy Group is P). Through the knowledge of M and Ni, each PE device can separately derive the number of PE devices, P, in the Redundancy Group. The PE device may therefore determine whether it has received an advertisement from the ascertained number of the other PE devices in the Redundancy Group.

If the PE device has not received numerical values (e.g., advertisements) from all of the other PE devices in the Redundancy Group at 410 and the timer has not expired at 412, the PE continues to await advertisements from the remaining PE devices at 408. If the PE device has not received numerical values from the other PE devices in the Redundancy Group at 410 and the timer has expired at 412, the PE device may compare the numerical value that has been transmitted with those numerical values (if any) that have been received from the other PE device(s) of the Redundancy Group. This may be accomplished by creating an ordered list of numerical values (e.g., PE identifiers) associated with the PE devices of the Redundancy Group for which numerical values have been obtained at 414.

If the PE device has received numerical values (e.g., advertisements) from all of the other PE devices in the Redundancy Group at 410, the PE device may compare the numerical value that has been transmitted with the numerical values that have been received from the other PE device(s) of the Redundancy Group. This may be accomplished by creating an ordered list of numerical values (e.g., PE identifiers) associated with the PE devices of the Redundancy Group at 416.

In one embodiment, the DF election process may use an algorithm in which the PE device having the highest numerical value is chosen as the DF. For example, the DF may be elected according to placement of the PE devices in the list of corresponding numerical values at 418. If the PE device is the first PE device in the list at 420, the PE device may designate itself as the DF for the Redundancy Group and send a DF-proposal to other PEs in the list/Redundancy Group at 422. A DF-proposal may be sent by a PE device to propose to the other PE devices in the Redundancy Group that it be elected as the DF for the Redundancy Group. An example DF-proposal will be described in further detail below with reference to FIGS. 5A-B.

In accordance with various embodiments, the PE device may not become the DF for the Redundancy Group until a handshaking process is completed. Once a handshake message has been received from each of the PE devices in the list/Redundancy Group, the PE device may become the DF for the Redundancy Group. Thus, after receiving acknowledgement messages (ACKs) from the other PE devices in the list/Redundancy Group, the PE device may become the DF by putting its port that is connected to the CE device in a forwarding state at 424. An example ACK message will be described in further detail below with reference to FIGS. 5A-B. Accordingly, forwarding of multicast traffic by the DF for a Redundancy Group to the CE device may be enabled according to messages transmitted among the PE devices in the Redundancy Group, where the messages conform to a handshaking protocol such as that described below with reference to FIGS. 5A-5B.

If the PE device is not the first PE device in the list at 420, the PE device may send an ACK in response to a DF proposal at 426. Once a DF has been elected, all other PE devices in the Redundancy Group will block multi-destination traffic to the CE device. More particularly, each PE device in the Redundancy Group other than the DF may block multi-destination traffic to the CE device for at least one port of the corresponding PE device, where the port is coupled to or connected to the CE device.

In accordance with various embodiments, a particular PE may not forward multicast traffic to a CE device as the DF on behalf of a Redundancy Group unless the PE devices in the Redundancy Group agree to the election of the PE device as the DF. Thus, the PE device may wait until all conflicts are resolved prior to acting as the DF. If the PE device that has sent a DF proposal subsequently receives a DF proposal from another PE device in the Redundancy Group, the PE device may forfeit its role as DF if the DF proposal that it has received indicates that the other PE device is a better candidate. In this manner, a DF may be elected for a particular Redundancy Group.

Although the disclosed embodiments are described with reference to a single Redundancy Group, it is important to note that the DF election process may be separately performed for multiple Redundancy Groups. Thus, a different DF may be elected for each of two or more Redundancy Groups. Each of the Redundancy Groups may serve a different one of two or more multi-homed devices. Thus, each different DF may forward multi-destination traffic for the corresponding Redundancy Group to the corresponding one of the multi-homed devices. Each of the multi-homed devices may be in a different customer network (or the same customer network).

The membership of PE devices in the Redundancy Groups may be mutually exclusive. Alternatively, there may be an overlap of membership among the Redundancy Groups. Thus, at least one of the PE devices in a Redundancy Group may be a member of one or more other Redundancy Groups.

Control Messages

Prior to the election process, the CE device may transmit information to the PEs within a Redundancy Group providing service to the CE device (and customer site). This may be accomplished via one or more Link Aggregation Control Protocol Data Units (LACPDUs). More particularly, the CE device may transmit information such as an identifier that identifies the Redundancy Group. The Redundancy Group identifier may be referred to as a Link Aggregation Control Protocol (LACP) System Identifier or multi-homing identifier (e.g., MH-ID). In addition, the CE device may transmit additional information such as the total number of links (from the CE device to the Service Provider Network), the number of links from the CE device to the Redundancy Group and/or the number of links that each of the PE devices in the Redundancy Group has connected to the CE device. From this information, the PE devices in the Redundancy Group may identify the CE device to which the PE devices are connected, as well as other pertinent information for the Redundancy Group.

In addition, the PE devices may communicate with one another via control messages. Furthermore, the PE devices within a particular Redundancy Group may communicate with one another to elect a DF for the Redundancy Group by sending control messages (e.g., advertisements). The various control messages may be composed in a control protocol such as Border Gateway Protocol (BGP). BGP is an interdomain routing protocol. More particularly, BGP performs interdomain routing in Transmission-Control Protocol/Internet Protocol (TCP/IP) networks. BGP is an exterior gateway protocol (EGP), which means that it exchanges routing information and performs routing between gateway devices of different autonomous systems. Through the exchange of routing information via BGP, gateway devices can obtain routing information for paths between autonomous systems.

A unique Autonomous System Number (ASN) is allocated to each Autonomous System (AS) for use in BGP routing. An AS may be a collection of connected IP routing prefixes (e.g., including routers and links) within the Internet that are under the control of a common entity or administration (e.g., enterprise network or service provider network) that presents a common, clearly defined routing policy to the Internet. Therefore, the ASNs may uniquely identify each network on the Internet.

After identifying the multi-homed CE device for the Redundancy Group, each PE device may advertise two routes for the multi-homed CE device connected to the PE device, which may be differentiated by corresponding routing prefixes and attributes. The first route that the PE advertises is directed to only those PE devices in the Redundancy Group (e.g., connected to the same CE device). The second route that the PE advertises is directed to all the PE devices participating in the Virtual Private Network(s) (VPNs) connected to the CE device. Each of the routes may be separately advertised via a corresponding BGP Update message. More particularly, the MH-ID may be provided in both a Network Layer Reachability Information (NLRI) attribute and an Extended Community Attribute of the BGP message.

The remote PE devices participating in a given VPN may be informed of the value for the MH-ID so that they can import the second route advertised. Thus, the PEs in the Redundancy Group may each advertise a Media Access Control (MAC) route for a broadcast address with the MH-ID encoded in a subnetwork point of attachment (SNPA) field of a Next-Hop Attribute of a BGP message. If a PE deviceis serving multiple multi-homed sites that are part of the same VPN, the PE device may advertise a list of MH-IDs in the SNPA field. The PE devices that are members of the Redundancy Group may automatically start importing the first route upon discovering that they are connected to a site with the corresponding MH-ID value.

Figure 5A:
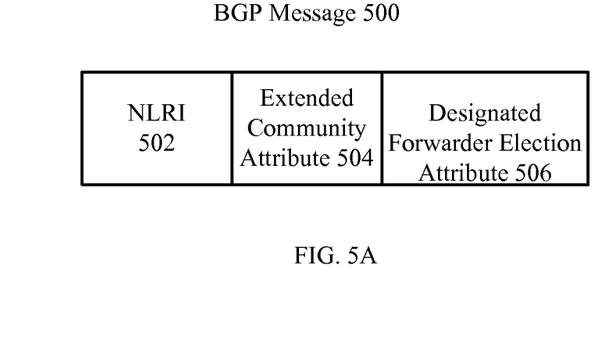
FIGS. 5A-B are diagrams that together illustrate an example control message that may be transmitted among the PE devices of a Redundancy Group.

During the election process, an advertising PE device may compose a control message such as a Designated Forwarder Proposal or ACK message, and transmit the control message to other PE devices within the Redundancy Group. FIG. 5A is a diagram illustrating an example control message that may be transmitted among the PE devices of a Redundancy Group. As shown in FIG. 5A, a BGP message 500 such as an update message may include a NLRI field 502 including the NLRI. The NLRI includes a length and a prefix. The length is a network mask in Classless Inter-Domain Routing (CIDR) notation (eg. /25) specifying the number of network bits, and the prefix is the network address for that subnet.

The BGP message 500 may also include an Extended Community Attribute field 504 including the Extended Community Attribute. The Extended Community value may be represented as an ASN or as an Internet Protocol (IP) address.

In accordance with various embodiments, a PE device provides the LACP System Identifier (e.g., multi-homing identifier) previously received from the CE device in a LACPDU in both the NLRI field 502 and the Extended Community Attribute 504. The LACP System Identifier may be used to form and/or identify the Redundancy Group. Thus, upon receiving BGP update messages from other PE devices, a PE device may discover that the other PE devices are within the same Redundancy Group.

The BGP message 500 may also include a DF Election Attribute 506 including one or more DF Election values. More particularly, the DF Election Attribute 506 may include a numerical value associated with the PE device sending the BGP message 500. For example, the numerical value may be a router identifier or randomly generated number. In addition, the DF Election Attribute 506 may include other information, as described below with reference to FIG. 5B.

Figure 5B:
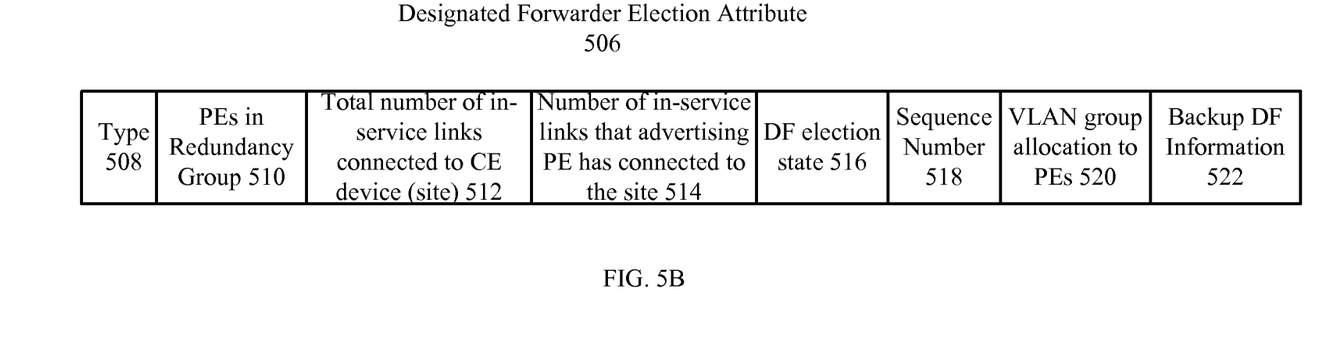

FIG. 5B is a diagram illustrating an example DF Election Attribute 506 that may be transmitted by PE devices in accordance with various embodiments. The DF Election Attribute 506 may include a Type 508, a list of the PEs in the Redundancy Group 510, a total number of in-service links connected to the CE device (or customer site) 512, a number of in-service links that the advertising PE device has connected to the customer site (e.g., CE device) 514, a DF election state 516, a Sequence Number 518, a VLAN group allocation among the PEs 520, and/or Backup DF information 522. The Type 508 may identify the type of the attribute as a DF Election Attribute.

The list of the PE devices in the Redundancy Group 510 (e.g., connected to the same customer site) may be an ordered list of numerical values (e.g., router identifiers) corresponding to the PE devices in the Redundancy Group (or a subset thereof). For example, the list may include a ranked list of numerical values (e.g., sorted according to numerical value). The list may include the router identifiers that were previously advertised by each PE (e.g., within the previously advertised route).

The total number of in-service links connected to the CE device 512 may be obtained by the PE device from a LACPDU previously transmitted by the CE device. Similarly, the total number of in-service links of the PE device connected to the CE device 514 may also be obtained by the PE device from a LACPDU previously transmitted by the CE device. Therefore, the election of the DF may be performed using information received from the CE device.

The DF election state 516 may indicate one of two different states. The first state indicates that the advertising PE device is sending a DF proposal that proposes that the advertising PE device become the DF for the Redundancy Group. The second state indicates that the advertising PE device is sending an acknowledgement (ACK) acknowledging (e.g., agreeing) to a proposal sent by another PE device. Therefore, the message 500 may be a DF Proposal or an Acknowledgement.

The Sequence Number 518 may identify an election instance for the Redundancy Group. The Redundancy Group may perform a new election periodically, or in response to a particular situation (e.g., failure of one of the PE devices in the Redundancy Group). Each time an election is performed within the Redundancy Group, the Sequence Number 518 may be incremented.

In accordance with various embodiments, the PE device with the highest numeric router identifier (among the pool of PE devices advertising the same multi-homing identifier NLRI) is chosen as the DF. The PE device having the highest numeric router identifier may therefore send a DF proposal. The PE device may also allocate VLANs among the other PE devices of the Redundancy Group and/or assign another PE device in the Redundancy Group to serve as a backup DF.

When the election state 516 indicates that the message is a DF proposal, the DF may provide both the VLAN group allocation among the PE devices 520 and/or the Backup DF information 522. More particularly, the DF may select one or more of the PE devices in the Redundancy Group to act as P-DF devices, divide a set of VLANs among the P-DF devices within the Redundancy Group and notify the PE devices in the Redundancy Group of this VLAN group allocation 520. More particularly, each of the P-DF devices may be assigned the sole responsibility for forwarding multi-destination traffic to the CE device for a particular subset of the set of VLANs. The subsets of VLANs may be non-overlapping subsets (e.g., VLANs 1-50, 51-100, etc.). The DF may or may not include itself in the allocation of the VLANs.

The PE sending the DF proposal may designate another PE in the Redundancy Group as the Backup DF 522. The Backup DF 522 may perform the same functions as the DF after the failure of the DF (or failure of a link between the DF and the CE device).

Since the control message described above with reference to FIGS. 5A-B may be sent during the election process, a PE device may ignore the election-specific control messages received from PE devices in another Redundancy Group identified by a different LACP System Identifier. Alternatively, these control messages may be transmitted only among the PE devices of the Redundancy Group. Of course, it is also possible for the PE devices outside the Redundancy Group to listen to these messages without participating in the election process.

It is important to note that the example message formats described above with reference to FIGS. 5A-B are merely illustrative. Therefore, other message formats may also be implemented. In addition, the control messages may be transmitted via a variety of protocols, and need not be transmitted via BGP.

As disclosed herein, a network device such as a PE device in a Redundancy Group may participate in an election process to elect one of two or more PE devices of the Redundancy Group to be a DF for the Redundancy Group, where the Redundancy Group is in a Service Provider network, and where the Redundancy Group serves a multi-homed device such as a CE device of a customer network. The network device may then forward multi-destination traffic to the CE device according to whether the network device is elected to be the DF for the Redundancy Group. Thus, the network device (or another network device in the Redundancy Group) acts as DF for the Redundancy Group to forward multi-destination traffic to the CE device.

In accordance with one embodiment, a network device such as a PE device in a Redundancy Group may participate in an election process to elect one of two or more PE devices of the Redundancy Group to act as a DF for the Redundancy Group. The network device may forward multi-destination traffic to the CE device when the network device has been elected as the DF for the Redundancy Group. The network device may block multi-destination traffic to the CE device when the network device has not been elected as the DF for the Redundancy Group.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via wireless controller models 4400 series and 2006 series, and access points models 1000 series and 12xx series available from Cisco Systems, Inc. of San Jose, Calif. The network devices may be specially configured routers such as specially configured router models 1600, 2500, 2600, 3600, 4500, 4700, 7200, 7500, 12000 and Carrier Routing System (CRS) available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

Figure 6:
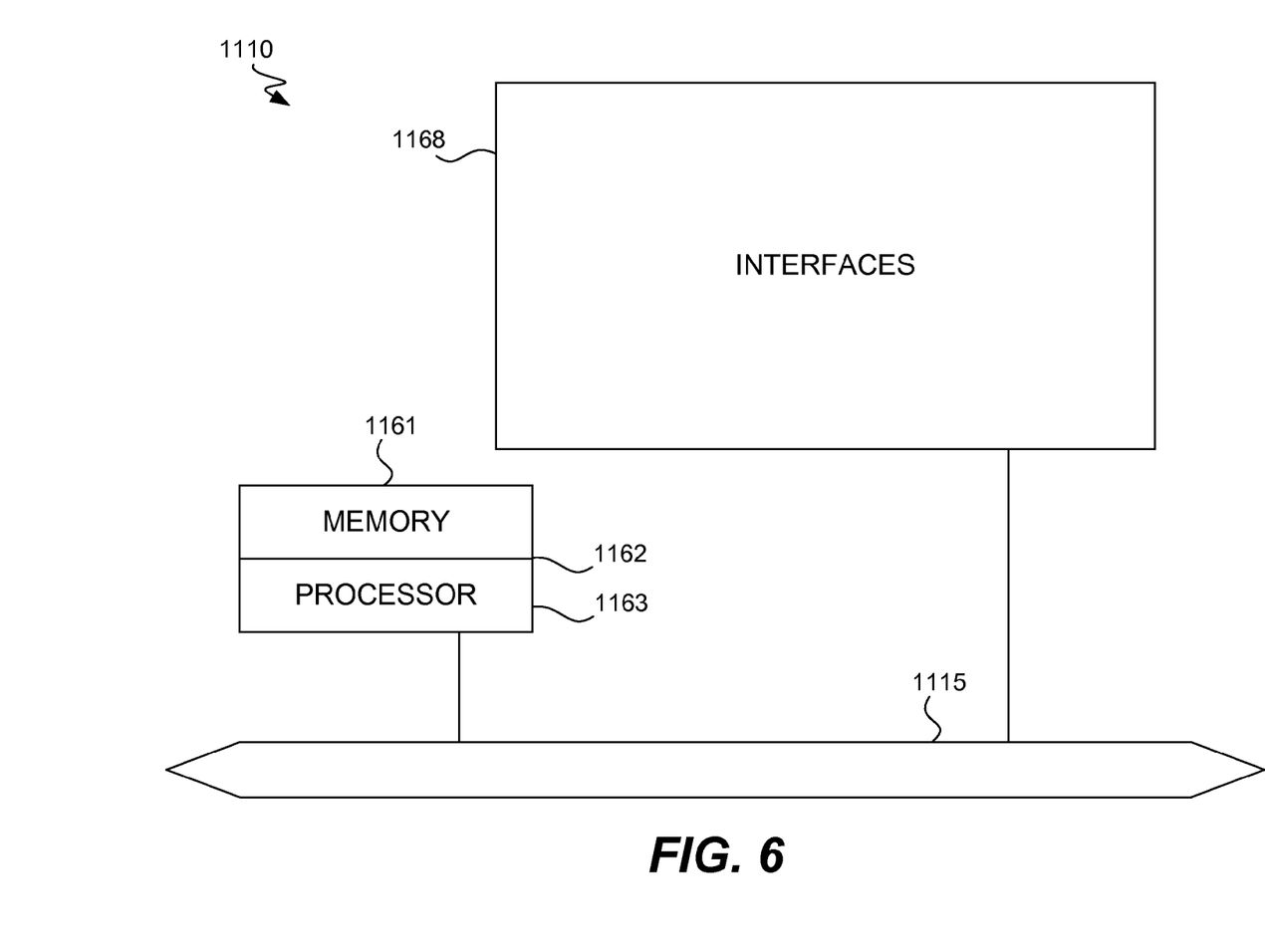
FIG. 6 is a diagrammatic representation of an example network device in which various embodiments may be implemented.

Each PE device and CE device may be implemented via a separate network device. In one embodiment, a network device (e.g., PE device or CE device) implementing the disclosed embodiments is a router. Referring now to FIG. 6, an example router 1110 suitable for implementing the disclosed embodiments includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 1163 such as a processor from the Motorola family of microprocessors or the MIPS family of microprocessors. In an alternative embodiment, processor 1163 is specially designed hardware for controlling the operations of router 10. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets or data segments over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1165) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   participating by a network device in electing one of two or more Provider Edge devices of a Redundancy Group to act as a Designated Forwarder for the Redundancy Group, wherein the Redundancy Group is in a Service Provider network, and wherein the Redundancy Group serves one or more Customer Edge devices of a customer network; and
   forwarding multi-destination traffic to the one or more Customer Edge devices according to whether the network device is elected to be the Designated Forwarder for the Redundancy Group,
   wherein non-elected Provider Edge devices of the Redundancy Group block all the multi-destination traffic to and from the one or more Customer Edge devices,
   wherein the multi-destination traffic includes multicast traffic, broadcast traffic, or destination unknown unicast traffic, and
   wherein the Designated Forwarder is elected using a total number of in-service links information received from the one or more Customer Edge devices.

2. The method as recited in claim 1, wherein participating in electing one of two or more Provider Edge devices of a Redundancy Group comprises:
   transmitting a numerical value to non-elected Provider Edge devices of the Redundancy Group;
   receiving numerical values from the non-elected Provider Edge devices of the Redundancy Group; and
   comparing the numerical value that has been transmitted with the numerical values that have been received from the non-elected Provider Edge devices of the Redundancy Group.

3. The method as recited in claim 1, further comprising:
   instructing one or more of the non-elected Provider Edge devices of the Redundancy Group that the one or more of the non-elected Provider Edge devices are each proxy Designated Forwarder Provider Edge devices responsible for forwarding the multi-destination traffic for a corresponding set of one or more Virtual Private Local Area Networks (VLANs) to the Customer Edge device.

4. The method as recited in claim 1, further comprising:
   instructing one of the non-elected Provider Edge devices of the Redundancy Group to act as a backup Designated Forwarder;
   wherein the backup Designated Forwarder takes over forwarding the multi-destination traffic to the one or more Customer Edge devices for a set of VLANs of a failed one of the Provider Edge devices in the Redundancy Group.

5. The method as recited in claim 1, wherein forwarding the multi-destination traffic to the Customer Edge device comprises:
   enabling forwarding of the multi-destination traffic to the one or more Customer Edge devices when the one of two or more Provider Edge devices is elected to be the Designated Forwarder for the Redundancy Group.

6. The method as recited in claim 1, wherein forwarding the multi-destination traffic to the Customer Edge comprises:
   blocking the multi-destination traffic to and from the one or more Customer Edge devices when the one of two or more Provider Edge devices is not elected to be the Designated Forwarder for the Redundancy Group.

7. The method as recited in claim 1, wherein electing one of two or more Provider Edge devices of a Redundancy Group to act as a Designated Forwarder for the Redundancy Group is performed according to a handshake protocol such that the two or more Provider Edge devices of the Redundancy Group agree to the election of the one of the two or more Provider Edge devices as the Designated Forwarder for the Redundancy Group.

8. An apparatus, comprising:
means for participating in electing one of two or more Provider Edge devices of a Redundancy Group to act as a Designated Forwarder for the Redundancy Group, wherein the Redundancy Group is in a Service Provider network, and wherein the Redundancy Group serves a Customer Edge device of a customer network; and
means for forwarding multi-destination traffic to the Customer Edge device by the apparatus according to whether the apparatus has been elected as the Designated Forwarder for the Redundancy Group,
wherein non-elected Provider Edge devices of the Redundancy Group block all the multi-destination traffic to and from the Customer Edge device,
wherein the multi-destination traffic includes multicast traffic, broadcast traffic, or destination unknown unicast traffic; and
wherein the Designated Forwarder is elected using a total number of in-service links information received from the Customer Edge device.

9. An apparatus, comprising:
a processor; and
a memory, at least one of the processor or the memory being adapted for:
participating in electing one of two or more Provider Edge devices of a Redundancy Group to be a Designated Forwarder for the Redundancy Group, wherein the Redundancy Group is in a Service Provider network, and wherein the Redundancy Group serves a Customer Edge device of a customer network; and
forwarding multi-destination traffic to the Customer Edge device according to whether the apparatus is elected to be the Designated Forwarder for the Redundancy Group,
wherein non-elected Provider Edge devices of the Redundancy Group block all the multi-destination traffic to and from the Customer Edge device,
wherein the multi-destination traffic includes multicast traffic, broadcast traffic, or destination unknown unicast traffic, and
wherein the Designated Forwarder is elected using a total number of in-service links information received from the Customer Edge device.

10. The apparatus as recited in claim 9, wherein participating in electing one of two or more Provider Edge devices of a Redundancy Group comprises:
transmitting a numerical value to non-elected Provider Edge devices of the Redundancy Group;
receiving numerical values from the non-elected Provider Edge devices of the Redundancy Group; and
comparing the numerical value that has been transmitted with the numerical values that have been received from the non-elected Provider Edge devices of the Redundancy Group.

11. The apparatus as recited in claim 9, at least one of the processor or the memory being further adapted for:
instructing one or more of the non-elected Provider Edge devices of the Redundancy Group that the one or more of the non-elected Provider Edge devices are each proxy Designated Forwarder Provider Edge devices responsible for forwarding the multi-destination traffic for a corresponding set of one or more Virtual Private Local Area Networks (VLANs) to the Customer Edge device.

12. The apparatus as recited in claim 9, at least one of the processor or the memory being further adapted for:
instructing one of the non-elected Provider Edge devices of the Redundancy Group to act as a backup Designated Forwarder;
wherein the backup Designated Forwarder takes over forwarding the multi-destination traffic to the Customer Edge device for a set of VLANs of a failed one of the Provider Edge devices in the Redundancy Group.

13. The apparatus as recited in claim 9, wherein forwarding the multi-destination traffic to the Customer Edge device comprises:
when the apparatus is elected to be the Designated Forwarder for the Redundancy Group, enabling forwarding of the multi-destination traffic to the Customer Edge device.

14. The apparatus as recited in claim 9, wherein electing one of two or more Provider Edge devices of a Redundancy Group to act as a Designated Forwarder for the Redundancy Group is performed according to a handshake protocol such that the two or more Provider Edge devices of the Redundancy Group agree to the election of the one of the two or more Provider Edge devices as the Designated Forwarder for the Redundancy Group.

15. A non-transitory computer-readable medium storing thereon computer-readable instructions, comprising:
instructions for participating in electing one of two or more Provider Edge devices of a Redundancy Group to be a Designated Forwarder for the Redundancy Group, wherein the Redundancy Group is in a Service Provider network, and wherein the Redundancy Group serves a Customer Edge device of a customer network; and
instructions for forwarding multi-destination traffic to the Customer Edge device according to whether the one of two or more Provider Edge devices is elected to be the Designated Forwarder for the Redundancy Group,
wherein non-elected Provider Edge devices of the Redundancy Group block all the multi-destination traffic to and from the Customer Edge device,
wherein the multi-destination traffic includes multicast traffic, broadcast traffic, or destination unknown unicast traffic, and
wherein the Designated Forwarder is elected using a total number of in-service links information received from the one or more Customer Edge devices.

16. The non-transitory computer-readable medium as recited in claim 15, wherein participating in electing one of two or more Provider Edge devices of a Redundancy Group comprises:
transmitting a numerical value to non-elected Provider Edge devices of the Redundancy Group;
receiving numerical values from the non-elected Provider Edge devices of the Redundancy Group; and
comparing the numerical value that has been transmitted with the numerical values that have been received from the non-elected Provider Edge devices of the Redundancy Group.

17. The non-transitory computer-readable medium as recited in claim 15, further comprising:
instructions for instructing one or more of the non-elected Provider Edge devices of the Redundancy Group that the one or more of the non-elected Provider Edge devices are each proxy Designated Forwarder Provider Edge devices responsible for forwarding the multi-destination traffic for a corresponding set of one or more Virtual Private Local Area Networks (VLANs) to the Customer Edge device.

18. The non-transitory computer-readable medium as recited in claim 15, further comprising:

instructions for instructing one of the non-elected Provider Edge devices of the Redundancy Group to act as a backup Designated Forwarder;

wherein the backup Designated Forwarder takes over forwarding the multi-destination traffic to the Customer Edge device for a set of VLANs of a failed one of the Provider Edge devices in the Redundancy Group.

19. The non-transitory computer-readable medium as recited in claim 15, wherein forwarding the multi-destination traffic to the Customer Edge device comprises:

enabling forwarding of the multi-destination traffic to the Customer Edge device when the one of two or more Provider Edge devices is elected to be the Designated Forwarder for the Redundancy Group.

20. The non-transitory computer-readable medium as recited in claim 15, wherein electing one of two or more Provider Edge devices of a Redundancy Group to act as a Designated Forwarder for the Redundancy Group is performed according to a handshake protocol such that the two or more Provider Edge devices of the Redundancy Group agree to the election of the one of the two or more Provider Edge devices as the Designated Forwarder for the Redundancy Group.

21. The non-transitory computer-readable medium as recited in claim 15, wherein one or more non-elected Provider Edge Devices in the Redundancy Group that are not elected to be the Designated Forwarder are prevented from forwarding the multi-destination traffic to the corresponding one of two or more multi homed devices;

wherein the one or more non-elected Provider Edge Devices in the Redundancy Group are permitted to forward the multi-destination traffic and non-multi-destination traffic received from the one of the two or more multi-homed devices; and wherein the one or more non-elected Provider Edge Devices are permitted to forward the non-multi-destination traffic to the one of the two or more multi-homed devices.

* * * * *